J. Vail,
Washing Machine Pounder.
Nº 69,726. Patented Oct. 8, 1867.
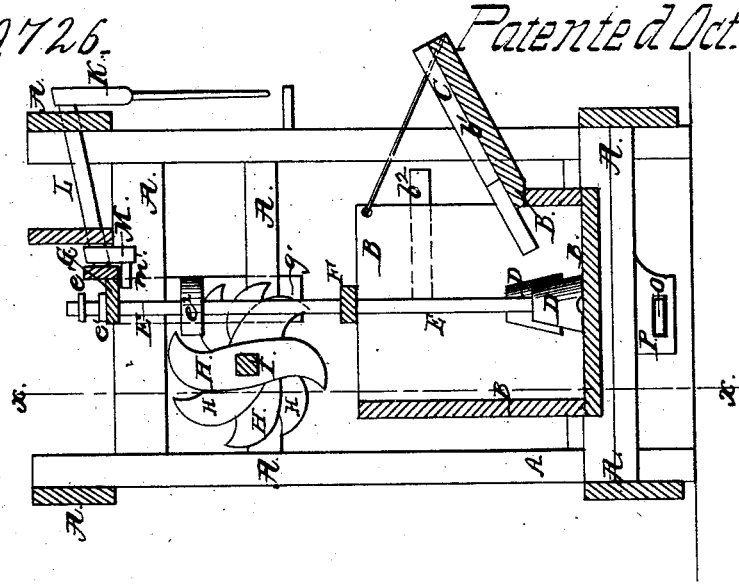
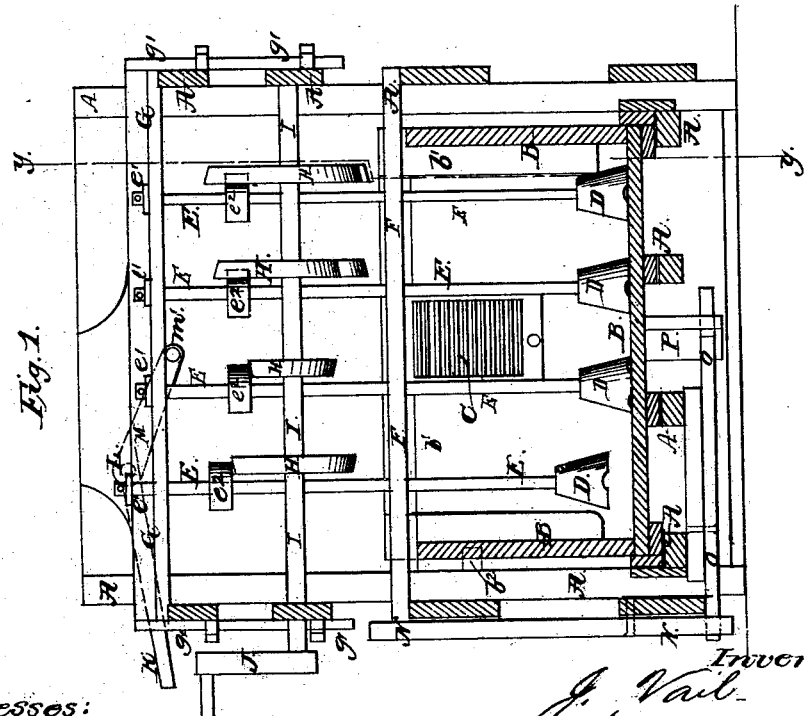
Witnesses:
Thos. Tincher
Wm. Trewin
Inventor:
J. Vail
Per Murray
Attorneys

United States Patent Office.

JOHN VAIL, OF YANKEE JIM'S, CALIFORNIA.

Letters Patent No. 69,726, dated October 8, 1867.

IMPROVED WASHING MACHINE.

*The Schedule referred to in these Letters Patent and making part of the same.*

TO ALL WHOM IT MAY CONCERN:

Be it known that I, JOHN VAIL, of Yankee Jim's, in the county of Placer, and State of California, have invented a new and improved Washing Machine; and I do hereby declare that the following is a full, clear, and exact description thereof, which will enable those skilled in the art to make and use the same, reference being had to the accompanying drawings, forming part of this specification, in which—

Figure 1 is a vertical longitudinal section of my improved machine, taken through the line $x$ $x$, fig. 2.

Figure 2 is a vertical cross-section of the same, taken through the line $y$ $y$, fig. 1.

Similar letters of reference indicate corresponding parts.

My invention has for its object to furnish a simple and convenient machine for washing clothes, which shall be easily operated, and will do its work quickly and thoroughly; and it consists in the combination and arrangement of the sliding-box or tub, pounders, shafts, cams, and crank-shaft with each other and with the frame of the machine; in the combination of an ordinary wash-board and movable side with the box; in the combination of the levers and block with the sliding tub and frame of the machine, and in the combination of the lever, shaft, arm, and movable frame with the frame of the machine and with the pounder-shafts; the whole being constructed and arranged as hereinafter more fully described.

A is the frame of the machine, upon the sides of which the box or tub B slides back and forth. The tub B is made rectangular in form, and the upper part of its front side $b^1$ is made movable, so that it may be turned down to stand at an angle, and it has an ordinary wash or rub-board, C, attached to it for convenience in rubbing any spots or parts of the clothes that may not be made sufficiently clean by the pounders. When closed the side $b^1$ is held up by spring catches $b^2$ attached to the ends of the tub, as shown in fig. 2. D are the pounders, which I prefer to make of oak or other hard wood, and about twenty-five pounds in weight. The pounders D are attached to the lower ends of the shafts E, which pass up through the guide-bar F, and through the movable bar or frame G. The shafts E have heads or caps $e^1$ attached to their upper ends to prevent their dropping through the frame or bar G. The shafts E are also furnished with disks or wheels, $e^2$, upon which the cams H act to raise and at the same time partially rotate the shafts E, so that the pounders D may strike the clothes each time in a different position. The cams H are double, so that each of them may operate its shaft twice at each revolution. The cams H are attached to the shaft I, which revolves in bearings in the frame A, and is operated by the crank J, attached to one of its ends. To the ends of the bar G are attached arms $g'$, that pass down through keepers attached to the frame A, so that the bar G may be raised or lowered, as desired, to regulate the stroke of the pounders according to the requirements of the articles being washed. K is a lever rigidly attached to the end of a shaft, L, which works in bearings in the frame A, and to its inner end is rigidly attached an arm or lever, M, having a pin, $m'$, attached to its free end, which passes under the middle of the bar or frame G, so that it may be raised or lowered by operating the lever K. This also enables the pounders to be lifted up out of the way when adjusting the clothes, or while moving the tub B back and forth, to bring all parts of the clothes under the action of the pounders D. N is a lever, pivoted to the end of the frame A, and the lower end of which is pivoted to the outer end of the lever O, which passes in beneath the sills of the frame A, to which it is pivoted, and the end of which enters and works in a slot in the block P, attached or pivoted to the bottom of the tub B, so that the said tub may be conveniently moved back and forth, as required.

It should be observed that the entire machine is made of wood, with the exception of the rubbing-board C, which may be made of zinc.

I claim as new, and desire to secure by Letters Patent—

1. The combination and arrangement of the sliding-box or tub B, the pounders D, shafts E, cams H, and shaft I with each other and with the frame A, substantially in the manner herein shown and described, and for the purpose set forth.

2. The combination of an ordinary wash-board, C, and movable side $b^1$ with the tub B, substantially as herein shown and described, and for the purpose set forth.

3. The combination of the levers N and O and block P with the sliding tub B, and with the frame A of the machine, substantially as herein shown and described, and for the purpose set forth.

4. The combination of the lever K, shaft L, arm M, and movable frame G with the pounder-shafts E, and with the frame A of the machine, substantially as herein shown and described, and for the purpose set forth.

JOHN VAIL.

Witnesses:
S. W. BOWMAN,
THOS. NESMITH, Jr.